United States Patent [19]

Yamada et al.

[11] Patent Number: 4,458,748
[45] Date of Patent: Jul. 10, 1984

[54] PLATE TYPE EVAPORATOR

[75] Inventors: Ken'ichi Yamada; Hiroyuki Sumitomo; Akira Horiguchi; Kenzo Masutani, all of Osaka, Japan

[73] Assignee: Hisaka Works, Limited, Osaka, Japan

[21] Appl. No.: 380,909

[22] Filed: May 21, 1982

Related U.S. Application Data

[60] Continuation-in-part of Ser. No. 228,746, Jan. 27, 1981, abandoned, which is a division of Ser. No. 063,403, Aug. 3, 1979.

[30] Foreign Application Priority Data

Jan. 18, 1979 [JP] Japan .................................. 54-5158

[51] Int. Cl.$^3$ .............................................. F28F 13/18
[52] U.S. Cl. ..................................... 165/133; 62/527;
165/166; 165/DIG. 10
[58] Field of Search ............... 165/133, 166, DIG. 10; 62/527

[56] References Cited

U.S. PATENT DOCUMENTS

| 3,384,154 | 5/1968 | Milton | 62/527 X |
|---|---|---|---|
| 3,825,064 | 7/1974 | Inoue | 165/133 X |
| 4,216,826 | 8/1980 | Fujikake | 165/133 |
| 4,291,758 | 9/1981 | Fujii et al. | 165/133 |
| 4,359,086 | 11/1982 | Sanborn et al. | 165/133 |
| 4,381,818 | 5/1983 | Sachar et al. | 165/133 |

OTHER PUBLICATIONS

Performance of Advanced Heat Transfer Tubes in Refrigerant–Flooded Liquid Coolers, Czikk et al., pp. 96-109.
The Mechanism of Heat Transfer in Nucleate Pool Boiling, Han et al., Int. J. Heat Mass Transfer, vol. 8, 1-65, pp. 887-914.

*Primary Examiner*—Sheldon J. Richter
*Attorney, Agent, or Firm*—Armstrong, Nikaido, Marmelstein & Kubovcik

[57] ABSTRACT

A plate type evaporator comprising a plurality of vertically extending plate elements assembled face-to-face to define therebetween alternate channels for a heating medium and for a liquid to be evaporated. The plate elements have porous layers formed on their opposed heat transfer surfaces functioning as the channels for the liquid to be evaporated. The porous layers are utilized as nuclear boiling accelerating members to improve the capability of evaporating liquid on the boiling heat transfer surfaces.

1 Claim, 13 Drawing Figures

Fig. 6
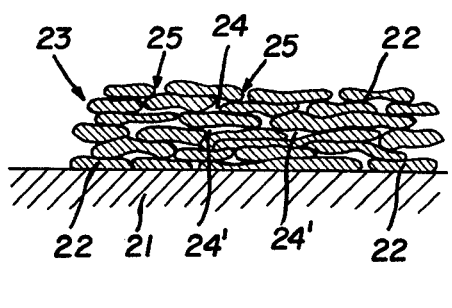
Fig. 7
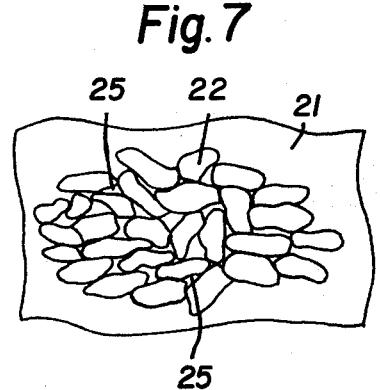
Fig. 8
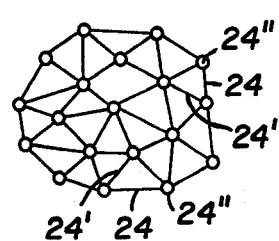
Fig. 10
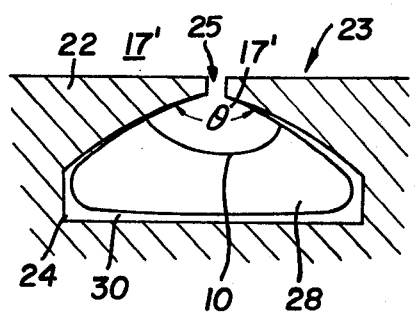
Fig. 9-A
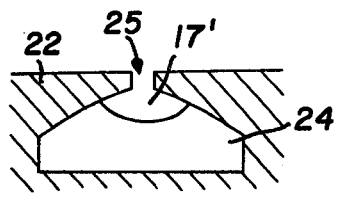
Fig. 9-C
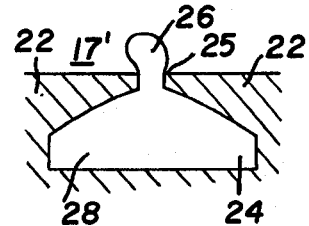
Fig. 9-B
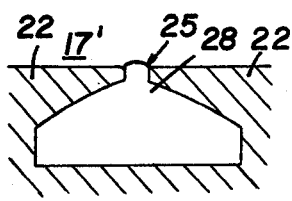
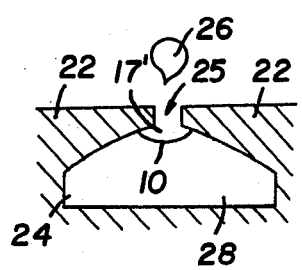
Fig. 9-D

PLATE TYPE EVAPORATOR

This application is a continuation-in-part application of U.S. Ser. No. 228,746 filed Jan. 27, 1981, now abandoned, which in turn is a divisional application of U.S. Ser. No. 63,403 filed Aug. 3, 1979.

BACKGROUND OF THE INVENTION

1. Field of the Invention

The present invention relates to a plate type evaporator.

2. Description of the Prior Art

Generally, in a plate type evaporator, alternate chnnels for a liquid to be evaporated and a heating medium are defined between a plurality of vertically extending plate elements assembled face-to-face, wherein the heating medium is fed to the heating medium channels while the liquid to be evaporated is fed to the liquid channels, so that indirect heat exchange takes place therebetween through the plate elements. As a result of such heat exchange, the heating medium if it is in gaseous state, is condensed, with the latent heat of condensation being used to evaporate the liquid in the adjacent channels through the plate elements. Thus, the heat transfer is effected while the liquid is boiling on the heat transfer surfaces of the plates.

When boiling begins in a saturated liquid, vapor bubbles will be generated with the dirt and air particles contained in said liquid serving as nuclei. In the case of so-called pool boiling in a liquid at rest, bubbles are continuously evolved from particular points on the heat transfer surface until the temperature difference between the heat transfer surface and the saturated liquid reaches a certain value. The points of evolution of bubbles on the heat transfer surface are called the nuclei of boiling and the boiling in the described state is called nuclear boiling. It is known that in nuclear boiling, the bubbles evolved act to stir the heated liquid in the channel to accelerate the boiling heat transfer.

When the heat transfer surfaces of the plate elements are flat, bubbles can hardly be evolved at the lower ends of the liquid channels because of a relatively high pressure due to the potential heads, so that it is impossible to fully achieve the effect of accelerating the generation of vapor which can be brought about by the evolution of bubbles stirring the liquid.

In this type of evaporators, various expedients have been adapted to improve the evaporation heat transfer coefficient in order to increase the efficiency of evaporation. For example, such expedients include a heat transfer surface formed with corrugations, a heat transfer surface provided with a layer of porous material, etc. In the former, the heat transfer surface is formed with vertically extending corrugations to provide therealong thick and thin regions in the flow of a fluid to be heated so that the portion of the liquid in the thick regions where heat is concentrated is caused to positively evaporate, while the portion of the liquid in the thin regions, after being heated, is allowed to flow to be added to the thick regions which are evaporating, to thereby increase the efficiency. The latter expedient is intended to cause the nuclear boiling of the liquid in the pores of the porous layer on the heat transfer surface so as to efficiently evaporate the liquid.

However, each expedient is designed only to provide a region for easy heat transfer and concentrate heat in said region so as to produce vapor concentratedly at said region. In other words, the vapor generated grows to a certain degree and leaves the heat transfer surface by the action of its buoyancy, but since such leaving is effected in a stationary state, the time from the time bubbles are evolved until they leave the heat transfer surface is prolonged. As a result, the bubbles remain between the heat transfer surface and the liquid until they leave the latter, so that they cut off the transfer of heat therebetween, thereby lowering the heat transfer coefficient. This problem becomes more serious particularly in the case of a porous heat transfer surface. That is to say, such porous heat transfer surface is intended to accelerate the evolution of bubbles by causing the nuclear boiling of the liquid in the pores, as described above, but undesirably, the bubbles evolved in the pores collide with the liquid flowing into the spaces vacated by the bubbles when they leave the pores, so that the movement of the bubbles is slowed down. This means that the period of time the bubbles cut off the transfer of heat between the liquid and the heat transfer surface is prolonged, thereby lowering the heat transfer coefficient. As a result, it is impossible to fully exhibit the effect of accelerating the evolution of bubbles which features a porous surface.

As is known in the art, the plate type evaporator comprises a plurality of heat transfer plates combined to define boiling liquid channels and heating medium channels alternately therebetween, the arrangement being such that a heating medium is fed into the heating medium channels, so that the boiling liquid filling the boiling liquid channels is evaporated through the heat transfer surfaces by the sensible heat or latent heat of condensation of the heating medium, the heat transfer being effected while the liquid in the boiling liquid channels is boiling on the heat transfer surfaces. That is, with the single-bubble producing mechanism, as is known in the art, tiny bubbles are produced in the cavities on the wall surfaces and gradually grow until they separate from the wall surfaces, this action being repeated to produce vapor. The greater the frequency of the production, growth and separation of bubles, the greater the evaporation capability. The cvaporation capability is proportional to the difference in temperature between the boiling liquid and the heating wall surface and to the heat transfer coefficient associated with the boiling liquid side, while the heat transfer coefficient is proportional to the degree of bubbling which means the frequency of the occurrence of boiling bubbles and to the difference in temperature between the boiling liquid and the heating wall surface and heavily depends on the shape or nature of the heat transfer surface. Where the same quantity of heat is to be transferred, therefore, the formation of a boiling heat transfer surface which provides a high degree of bubbling will ensure a greater evaporation capability even if the temperature difference is small.

The conventional smooth-surface plate has a low heat transfer coefficient and a low degree of bubbling, so that its evaporation capability is low. In the case of a porous boiling heat transfer surface typified by zeolite, the degree of bubbling is high, and bubbles remaining in the pores prevent entry of the boiling liquid and allow activated cavities to be present at all times to accelerate boiling. However, there has been observed a drawback that once the spaces in the porous material are filled with liquid, activated cavities no longer exist and boiling is not accelerated.

SUMMARY OF THE INVENTION

The present invention has solved the conventional problems described above and has for its principal object the provision of a novel boiling heat transfer surface construction, wherein particles, flakes or the like of a metal having a high heat transfer coefficient are superposed in layers on the wall surface of a heat transfer plate to define chain-like-spaces in the layers, thereby increasing the degree of bubbling and accelerating the transfer of heat.

More particularly, the invention relates to improvements in the boiling heat transfer surface construction of the plate type evaporator and provides a highly effective boiling heat transfer surface construction having a high boiling heat transfer coefficient, being capable of accelerating nuclear boiling, transferring large quantities of heat and reliably producing vapor, even if the difference in temperature is small.

A plate type evaporator according to the invention comprises a plurality of plate elements, eace plate element having a plurality of vertically extending ridges transversely spaced and projecting toward the associated channel for a liquid to be evaporated, said ridges abutting against the surface of the opposed plate element to divide the liquid channel into a plurality of narrow sections where evaporation can take place with ease, the areas of contact between said ridges and the associated plate surface facilitating the evolution of bubbles. Even in the lower regions of the channels where boiling hardly occurred owing to the pressures due to the potential heads of the liquid, nuclear boiling is enhanced and, moreover, since the bubbles evolved grow while ascending a long distance, the unevaporated portion of the liquid is stirred to increase the evaporation accelerating effect. Thus, a heat transfer surface which is satisfactory in all respects can be obtained.

In order to assure higher heat transfer, the invention also provides a plate type evaporator comprising a return path connecting a vapor outlet and an evaporation liquid inlet and serving as a circulation passageway for the evaporation liquid to circulate therethrough, and a liquid supplying nozzle provided in said circulation passageway for resupplying liquid to compensate for the amount evaporated, wherein the natural circulation of liquid is caused by the pumping effect brought about by evaporation and besides this the rate of circulation of liquid is increased by injecting a resupply of liquid by said liquid supplying nozzle whereby the liquid is caused to flow along the heat transfer surface.

In addition, if the heat transfer surface of the plate has particles melt-blasted or bonded thereto to form a porous layer having labyrinth spaces therein, the heat transfer coefficient for nuclear boiling is improved as compared with a smooth-surfaced heat transfer plate, so that an efficient evaporator can be provided.

These and other features of this invention will become more apparent from the following description to be ginven with reference to the accompanying drawings.

BRIEF DESCRIPTION OF THE DRAWINGS

FIGS. 1 and 2 show the heat transfer surface construction of an evaporator according to the invention, wherein FIG. 1 is a cross-sectional view of heat transfer plates assembled face-to-face, and FIG. 2 is a front view of a heat transfer plate taken along the line II—II of FIG. 1;

FIGS. 4 and 5 show another embodiment of the heat transfer surface construction according to the invention, wherein FIG. 4 is a fragmentary front view of a porous heat transfer surface, and FIG. 5 is a section taken along line V—V of FIG. 4;

FIG. 6 is a sectional view of the principal portion, showing a boiling heat transfer surface construction according to another embodiment of the invention;

FIG. 7 is a plan view thereof;

FIG. 8 is a diagrammatic view, showing the overall linkage of chain-like-spaces in metal flake layers;

FIGS. 9A through 9D are enlarged sectional views of the principal portion, showing how a bubble is produced; and FIG. 10 is an enlarged sectional view of the principal portion, showing a state of equilibrium between a boiling liquid and a bubble during operation.

DESCRIPTION OF THE PREFERRED EMBODIMENTS

Figure 1:
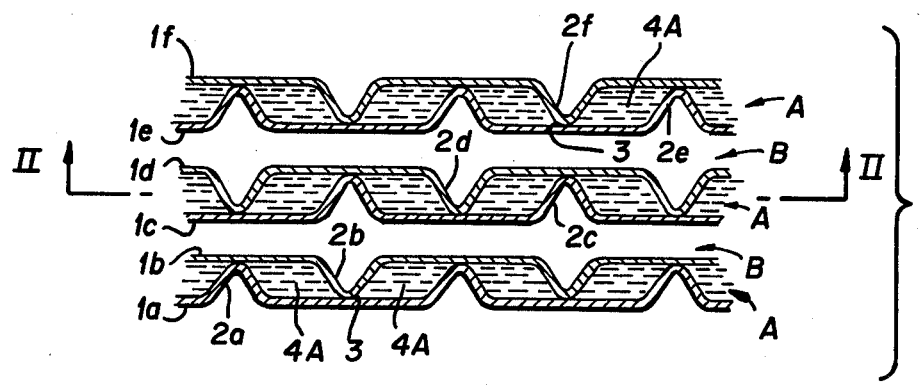
Figure 2:
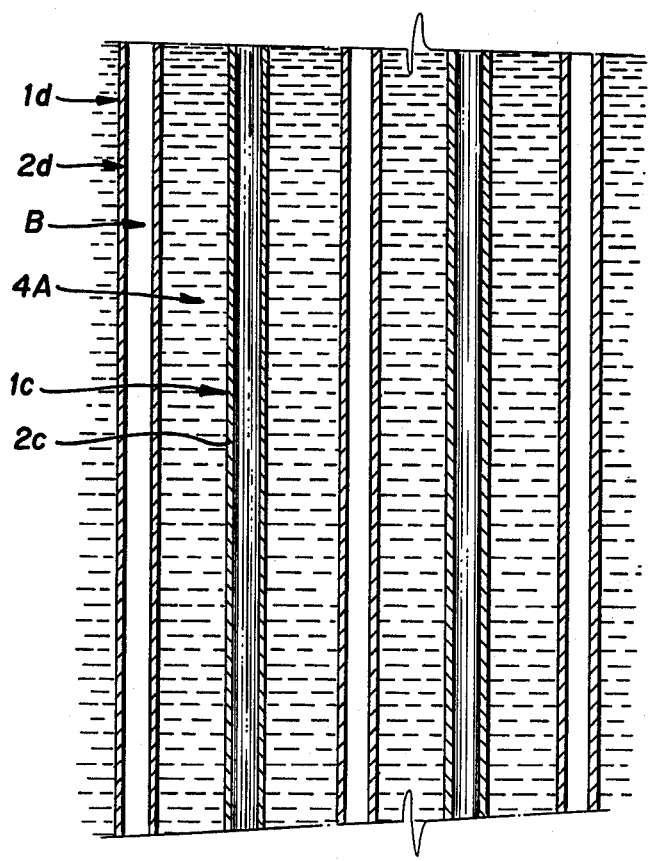

Referring to FIGS. 1 and 2, heat transfer plates are indicated by $1a$–$1f$, each plate having vertically extending ridges $2a$–$2f$ transversely spaced apart from each other afixed distance. FIG. 1 shows a pack of heat transfer plates assembled face-to-face to define therebetween channels A for supplying a liquid to be evaporated and channels B for supplying a heating medium, said channels A and B alternating with each other. In each heat transfer plate, the ridges 2 project toward the associated channel A. More particularly, with a pair of adjacent plates $1a$ and $1b$ taken as an example, the ridges $2a$ on one plate $1a$ are displaced, for example, ½ pitch relative to the ridges $2b$ on the other plate $1b$ so that they may abut against the flat portions between the ridges $2b$ on the other plate $1b$. Thus, the ridges $2a$ and $2b$ abut against the surfaces of the opposed plates $1a$ and $1b$ at positions indicated by 3 to divide the channel A between the plates $1a$ and $1b$ into a plurality of vertically extending and laterally separated sections 4A. The plates $1c$–$1f$ having ridges $2c$–$2f$ are arranged in the same manner, as shown. In addition, though not illustrated, between plates difining the channel B, for example, the plates $1b$ and $1c$, suitable distance pieces are provided to maintain the proper spacing therebetween necessary for the channel B.

A liquid to be evaporated is charged into the liquid channels A while a heating medium is supplied to the heating medium channels B, whereupon the liquid receives the heat of the heating medium through the plates, that is, it is heated. In this connection, it is to be noted that the regions of contact 3 between the ridges and the plate surfaces serve to assist in the formation of nuclei of boiling, so that bubbles are vigorously evolved adjacent said regions of cnotact 3. Since the bubbles of vapor evolved ascend a long distance along the ridges 2, they act to stir the liquid, thus accelerating the evaporation of the liquid.

Figure 3:
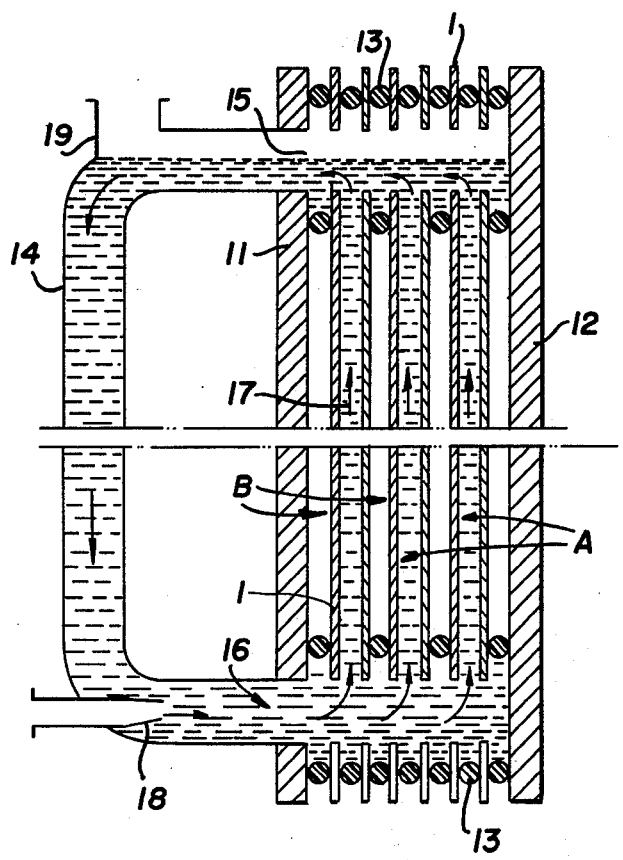
FIG. 3 is a longitudinal section of a plate type evaporator having heat transfer plates shown in FIGS. 1 and 2.

FIG. 3 shows a longitudinal section of a plate type evaporator, referred to as the liquid repletion type, using the heat transfer plates shown in FIGS. 1 and 2. The numerals 11 and 12 designate frames between which heat transfer plates 1 which constitute the principal portion of the evaporator are held, and gaskets 13 are disposed between said plates 1 to define channels A and B.

When a liquid to be evaporated is charged into the liquid channels A while a heating medium is supplied to the heating medium channels B, the liquid is heated by the heating medium in the adjacent heating medium channels B. In this connection, as described above, the regions of contact 3 (FIG. 1) serve to assist in the evolution of bubbles and a large number of bubbles are evolved in the vicinity of the regions of contact 3. Since these bubbles ascend the narrow sections 4A (FIG. 1), the unevaporated liquid is stirred to have its evaporation accelerated. At the same time, the pumping action brought about by evaporation causes the natural circulation of the liquid in the liquid channel A as indicated by arrows 17 through a return path 14 through which the upper opening 15 of the liquid channels A communicates with the lower opening 16. As a result, moving heat is given to the heat transfer surfaces. Further, in order to supply liquid to compensate for the amount evaporated, the liquid supplying nozzle 18 injects liquid into the lower end of the return path 14 at any desired rate, resulting in increasing the flow rate of said natural circulation of liquid. Therefore, the rate of flow of liquid (indicated by arrows 17) along the heat transfer surfaces of the plates 1 is increased to assure high boiling heat transfer. The vapor generated is taken out through a discharge port 19 provided in the top of the evaporator.

Figure 4:
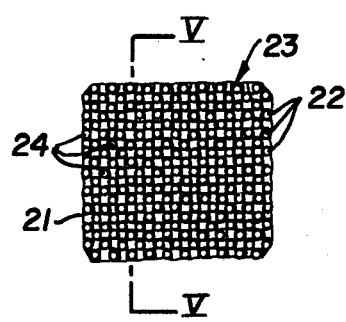
Figure 5:
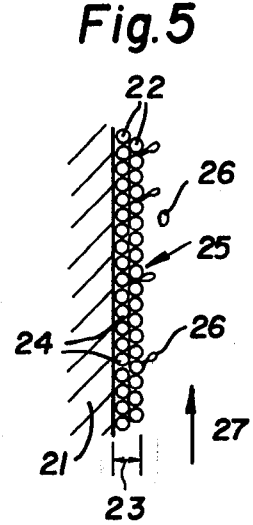

FIGS. 4 and 5 illustrate a heat transfer plate having a porous surface which may be employed in a plate type evaporator in order to accelerate the evolution of bubbles during nuclear boiling. As illustrated, the surface of a metal plate 21 is formed with a porous layer 23 composed of a large number of particles 22. The porous layer 23 may be formed by heating the particles 22 to a suitable temperature at which the surfaces of the particles just begin to melt and blasting them to the surface of the plate 21 at high speed as by gas pressure. Alternatively, it may be formed by bonding the particles 22 to the surface of the plate 21 by suitable adhesive means. The partles 22 may be in a single layer or in a multi-layer. FIG. 5 illustrates a two-layer formation. If the surface of the plate 21 is smooth, the particles 22 can hardly be melt-bonded thereto. Thus, it is advisable to roughen the surface in advance as by sand-blasting. Labyrinth spaces 24 are thus defined in the interior of the porous layer 23, and the surface 25 is rough.

In addition, although the particles 22 are shown as spheres for the sake of clarity, they are not limited thereto, and they may be metal flakes to be presently described, provided that spaces 24 are defined in the interior. Further, the porous layer 23 may be formed to cover the whole or a part of the surface of the plate 21.

Another embodiment of the present invention will now be described with reference to FIGS. 6 through 10.

In FIGS. 6 and 7, the numeral 21 denotes a heat transfer plate element formed of any of various metallic materials having the necessary properties including corrosion resistance in consideration of the nature of fluids flowing on heating and boiling sides. The numeral 22 denotes flat, tiny metal flakes of good heat conduction, bonded in layers on the boiling liquid-associated wall surface of the heat transfer plate element 21, thus forming a plurality of metal flake layers 23. The numeral 24 denotes chain-like-spaces surrounded with the metal flakes 22, and 25 denotes openings exposed to the surface of the uppermost metal flake layer 23. The metal flakes 22 are sufficiently metal-bonded to the heat transfer plate element 21 and between each other so that metal flakes will not peel off. The metal flake layers have a large number of very small chain-like-spaces 24 defined therein by the metal flakes 22. These chain-like-spaces 24 are not closed but communicate with adjoining ones 24' which are formed by adjacent metal flakes 22 in every direction, and spread in a chain-like-pattern, as shown in FIG. 8, wherein a plurality of chain-like-spaces 24 and 24' gather at a communicating space 24" which extends vertically and these spaces communicate with each other, as a whole, in a radial and net-like-pattern and finally lead to the boiling-associated surface at the openings 25.

In using the heat transfer plate having the boiling heat transfer surface construction described above, a heating medium is allowed to flow along the smooth surface (back side) of the heat transfer plate element 21 while a boiling liquid 17' is allowed to flow along the metal flake layer 23 side (face side). Then, as shown in FIGS. 9A through 9D, the heat transferred from the heating medium is transferred to the metal flakes 22 through the heat transfer plate element 21; thus, the transfer of heat to the many metal flakes 22 takes place, and the boiling liquid 17' takes the heat away from the surfaces of the metal flakes 22 and produce bubbles 28 in the chain-like-spaces 24 and 24', allowing said bubbles to grow. With the growth of the bubbles 28, the chain-like-spaces 24 form boiling liquid films on the bubbles 28 and on the metal flake surface and accelerate the heat transfer. Consequently, all the chain-like-spaces 24 and 24' are finally filled with vapor (bubbles), which will separate as a bubble lump 26 from the opening 25 in the metal flake surface. This action is repeated to provide vapor.

A consideration will now be given of the manner of heat transfer to the boiling liquid 17' through the heat transfer plate element 21. Let q be a heat flux, $\alpha$ be boiling heat transfer coefficient, and $\Delta T$ be the difference in temperature between the heating wall surface and the boiling liquid. Then, $$q \propto \alpha \cdot \Delta T.$$

Letting f$\epsilon$ stand for the degree of bubbling, the boiling heat transfer coefficient $\alpha$ is expressed as follows.

$$\alpha \propto f\epsilon^2 \cdot \Delta T^2.$$

The degree of bubbling f$\epsilon$ is the frquency of the occurrence of bubbles and may be taken as the boiling acceleration factor, it being influenced by the shape and nature of the heat transfer wall to a great extent. Therefore, if the degree of bubbling of the heat transfer surface is high, it is possible to attain a high evaporation processing capability even if the temperature difference $\Delta T$ is small. In the heat transfer plate of the present invention, since the surface of the heat transfer plate element 21 has metal flakes 22 of good heat conduction superposed thereon, the heat transfer is satisfactory, and since the chain-like-spaces 24 between the metal flakes 22 are very small, the bubble production efficiency is high, making it possible to form a heat transfer surface having a high evaporation capability.

During operation, when the bubble lumps 26 separate from the openings 25 in the metal flake layer 23, there is a danger of the boiling liquid 17' entering the chain-like-spaces 24 and 24' through the openings 25. However, since the liquid and gas phases are dynamically blanced each other by the surface tension of the boiling liquid 17' at the openings 25, the boiling liquid 17' is prevented from entering the openings 25 and the cavities can be effectively kept from disappearing. Accordingly, it is possible to maintain the activated cavities in a stabilized state within the chain-like-spaces 24 and 24'. Even if said dynamic balance is upset at some of the openings 25 to allow the entry of some boiling liquid into the metal flake layers 23, lower ones of the metal flake layers 23 provide the easiest transfer of heat. Thus, in embodying the present invention, even if metal flakes 22 of good heat conduction are superposed and bonded together and to the wall surface of the heat transfer plate element 21 associated with the boiling liquid side, the heat capacity decreases as the uppermost metal flake layer 23 is reached, while, on the contrary, the lower metal flake layers 23 possess a sufficient heat capacity to ensure the presence of activated cavities at all times, thus accelerating the growth of bubbles. As a result, the action of pushing the gas-liquid interface of the intruding boiling liquid back to the openings 25 takes place, preventing entry of the boiling liquid 17' into the chain-like-spaces 24 and 24'. More particularly, as shown in FIG. 10, if the throat diameter of the openings 25 is small and the angle $\theta$ spreding toward the chain-like-space 24 is an obtuse angle forming a flat trapezoid or flat triangle, then the gas-liquid interfaces do not enter all the chain-like-spaces under the action of the surface tension of the boiling liquid at the time of separation of bubbles and instead become balanced, allowing the activated cavities to exist. Further, the boiling liquid 17' gather at the ends or acute-angle corners of the chain-like-spaces 24 and a thin film 30 of the boiling liquid 17' is formed on the flat portion, such thin films 30 being present on the metal flakes 22 or on the wall surface of the heat transfer plate element 21, and the heat transfer is concentrated on said thin films 30, so that the high heat transfer coefficient is maintained. This phenomenon takes place in each of the chain-like-spaces 24 and 24' of the metal flake layers 23, increasing the heat transfer coefficient of the heat transfer plate as a whole, thereby markedly improving the evaporation processing capability of the boiling heat transfer surface.

The metal flake layers 23 may be provided over the entire region of the boiling liquid channel, but a practically sufficient increase in the evaporation capability can be expected even if only the lower half of the boiling liquid channel is covered with the metal flake layers 23. Further, in embodying the present invention, it is desirable that the metal flakes 22 made of a material having a high heat conductivity, such as aluminum or copper, and that in order to maintain the size of the porous layers contributing to increasing the evaporation capability in a suitable range, the metal flakes 22 each have a length of 80 to 200 microns and a thickness of 50 to 150 microns.

In the plate type evaporator comprising heat transfer plates having said metal flake layers 23, it has been found from the results of experiments in boiling heat transfer that the degree of bubbling f$\epsilon$, i.e., the boiling acceleration factor is as high as 20 times the value for the conventional plate type evaporator having no metal flake layer and that the metal flake layers 23 form a high-performance heat transfer mechanism. Therefore, according to the present apparatus, it is possible to attain a very high evaporation capability even if the difference in temperature between the boiling liquid and the heating wall surface is small.

As has been described so far, with this invention concerning heat transfer on the heat transfer wall surface of a heat exchanger involving phase changes, metal flakes of good heat conduction are superposed and bonded together and to the wall surface of the heat transfer plate element associated with the boiling liquid side to define very small spaces between said metal flakes, said spaces communicating with each other radially and meshwise in all directions throughout the metal flake layers to form chain-like-spaces which have small openings on the metal flake layer surface, said openings being in the form of a flat trapezoid or flat triangle in cross-section, the arrangement being such that in the chain-like-spaces in said metal flake layers, the boiling liquid is fed through the openings into the chain-like-spaces by capillary action in such a manner as to fill every nook and corner thereof, while the heat supplied from the heating medium is transferred from the heat transfer plate element to the metal flakes, so that the boiling liquid in the chain-like-spaces is evaporated by the heat transferred thereto at the surfaces of the metal flakes contacting said boiling liquid, the produced vapor being held in the chain-like-spaces, and when the latter are filled up with the vapor, the gas-liquid interfaces cooperate with the surface tension of the liquid at the openings in the metal flake layer surface to prevent entry of the boiling liquid into the chain-like-spaces, while in the chain-like-spaces, thin films of boiling liquid are held at the interfaces between the metal flakes and the chain-like-spaces, i.e., on the metal flake surfaces at all times, and while the vapor which is not held in the chain-like-spaces is removed from the openings in the metal flake layer surface. Therefore, according to the present invention, in the heat transfer plate of the plate type evaporator, the use of the heat transfer surface construction having metal flakes superposed and bonded together and to the surface thereof associated with the boiling liquid side makes it possible to attain a high rate of heat transfer even if the difference in temperature between the boiling liquid and the heat transfer surface is small, so that the evaporation capability is increased to a great extent.

The heat transfer plates of the construction described above are assembled face-to-face so that the side where the porous layer 23 is provided faces the channel for a liquid to be evaporated. Therefore, the liquid enters the spaces 24 in the porous layer 23 and heated by the plates 21 and the particles 22 therearound, whereby concentrated heating is effected. That is to say, nuclear boiling is caused in the spaces 24. As a result, the evolution of bubbles is accelerated, so that bubbles 26 are vigorously evolved from the surface 25 of the porous layer 23 and grow. As the bubbles 26 grow, their buoyancy increases, causing the bubbles 26 to move through the labyrinth spaces 24 to appear at the surface 25 of the porous layer, from which they are then separated by the flow of the liquid (indicated by an arrow 27) in the channel A. In brief, the bubbles 26 evolved pass through the labyrinth spaces 24 to the surface 25 and washed away downstream. The flow of the liquid in the channel A is such that particularly when the channel A is narrow, the bubbles which are evolved as accelerated by nuclear boiling and grow tend to float up to push the preceding bubbles on the downstream side, such movement of the bubbles imparting flow to the liquid. This is the so-called natural circulation phenomenon, and the evolved bubbles 26 are taken out through the discharge port 19 on the most downstream side, as in the case of the evaporator shown in FIG. 3, while the unevaporated liquid overflows to circulate to the upstream side, such streams 17 and 27 serving to forcibly separate the bubbles 26 from the surface of the porous layer 23. The same may be said of forced circulation.

Since the large number of "labyrinth exits" on the surface of the porous layer are communicating with the "labyrinth paths" 24 in the interior of the porous layer 23, the liquid is entering one labyrinth exit or another at any moment immediately after a bubble has left such exit. Thus, the entering of liquid and the outflow or separation of a bubble do not interfere with each other at any labyrinth exit. Therefore, the separation of bubbles from the heat transfer surface is rapidly effected, which, coupled with the forced separation of bubbles by the flow of liquid, greatly shortens the period of time bubbles intervene between the liquid and the heat transfer surface to cut off the transfer of heat therebetween.

Further, as is apparent from the drawings, the porous layer surface is a rough surface which cooperates with the flow of the liquid to stir the liquid flowing therealong, assuring the even contact of the liquid with the heat transfer surface for better heat exchange. Moreover, since this liquid stirring action shakes the bubbles on the heat transfer surface to assist in the separation of the bubbles therefrom, the heat transfer coefficient for nuclear boiling is further improved.

What is claimed is:

1. A plate type evaporator comprising a plurality of vertically extending plate elements put together face-to-face to define therebetween alternate channels for a heating medium and for a liquid to be evaporated, and porous layers acting as nuclear boiling inducing members formed on the opposed heat transfer surfaces of the plate elements functioning as channels for the liquid to be evaporated, the porous layers consisting of a plurality of metal flakes superposed and bonded together and to the wall surface of the plate element associated with the boiling liquid side to define very small spaces between the metal flakes, said flakes being made of a metal selected from the group consisting of copper and aluminum and having a length of 80-200 microns and a thickness of 50-150 microns, said spaces communicating with each other radially and meshwise to form chain-like-spaces which have small openings on the metal flake surface layer, said spaces each being in the form of a flat trapezoid or flat triangle in cross-section with said small openings being directed toward the metal flake surface layer and the inner surface of said space defining an obtuse angle spreading away from said small opening, whereby boiling liquid is fed into said chain-like-spaces by capillary action to fill every nook and corner thereof, while heat supplied from the heating medium is transferred from the plate element to the metal flakes, so that the boiling liquid in the chain-like-spaces is evaporated by the heat transferred thereto at the surfaces of the metal flakes contacting said boiling liquid, the produced vapor being held in the chain-like-spaces, and when the latter are filled up with the vapor, the gas-liquid interfaces cooperate with the surface tension of the boiling liquid at said openings to prevent entry of boiling liquid into the spaces, while in the spaces, thin films of boiling liquid are held on the metal flake surfaces at all times, and while the vapor which is not held in the chain-like-spaces is removed from said openings in the metal flake surface layer.

* * * * *